United States Patent [19]

Herbst et al.

[11] Patent Number: 5,051,164

[45] Date of Patent: Sep. 24, 1991

[54] CRYSTALLINE POROUS SILICATE COMPOSITE AND ITS USE IN CATALYTIC CRACKING

[75] Inventors: Joseph A. Herbst, Turnersville, N.J.; Albin Huss, Jr., Chadds Ford, Pa.

[73] Assignees: Mobil Oil Corporation, Fairfax, Va.;

[21] Appl. No.: 298,866

[22] Filed: Jan. 13, 1989

Related U.S. Application Data

[62] Division of Ser. No. 93,279, Sep. 4, 1987, abandoned.

[51] Int. Cl.$^5$ .................... C10G 11/05; B01J 29/06
[52] U.S. Cl. .................................. 208/120; 502/64
[58] Field of Search .................. 502/64, 65; 208/120

[56] References Cited

U.S. PATENT DOCUMENTS

| | | | |
|---|---|---|---|
| 3,244,643 | 4/1966 | Schwartz | 502/64 |
| 3,329,627 | 7/1967 | Gladrow et al. | 502/64 |
| 3,329,628 | 7/1967 | Gladrow et al. | 502/65 |
| 3,410,808 | 11/1968 | Smith et al. | 502/65 |
| 3,413,238 | 11/1968 | Gladrow et al. | 502/64 |
| 3,457,190 | 7/1969 | Vesely | 252/451 |
| 3,758,403 | 9/1973 | Rosinski et al. | 298/120 |
| 3,769,202 | 10/1973 | Plank et al. | 208/111 |
| 3,866,094 | 5/1975 | Pilato et al. | 252/451 |
| 3,894,931 | 7/1975 | Nace | 208/73 |
| 3,894,933 | 7/1975 | Owen | 208/77 |
| 3,894,934 | 7/1975 | Owen et al. | 208/78 |
| 4,144,194 | 3/1979 | Guidry | 252/451 |
| 4,309,279 | 1/1982 | Chester et al. | 208/120 |
| 4,309,280 | 1/1982 | Rosinski et al. | 208/120 |
| 4,521,298 | 6/1985 | Rosinski et al. | 208/120 |
| 4,522,705 | 6/1985 | Chu et al. | 208/120 |
| 4,552,648 | 11/1985 | Rosinski et al. | 208/120 |
| 4,612,298 | 9/1986 | Hettinger, Jr. et al. | 502/65 |
| 4,787,967 | 11/1988 | Herbst et al. | 208/120 |
| 4,802,971 | 2/1989 | Herbst et al. | 208/120 |
| 4,814,068 | 3/1989 | Herbst et al. | 208/120 |
| 4,826,586 | 5/1989 | Herbst et al. | 208/120 |
| 4,828,679 | 5/1989 | Herbst et al. | 208/120 |
| 4,830,728 | 5/1989 | Herbst et al. | 208/120 |
| 4,861,741 | 8/1989 | Herbst et al. | 208/120 |
| 4,874,503 | 10/1989 | Herbst et al. | 208/120 |

FOREIGN PATENT DOCUMENTS

| | | |
|---|---|---|
| 1557305 | 3/1968 | France . |
| 2083594 | 12/1971 | France . |
| WO80/02026 | 3/1980 | World Int. Prop. O. . |

*Primary Examiner*—Carl F. Dees
*Attorney, Agent, or Firm*—Alexander J. McKillop; Charles J. Speciale; Laurence P. Hobbes

[57] ABSTRACT

Catalyst compositions of inorganic oxide bound shape-selective porous crystalline silicates are prepared by adding binder precursors to a porous crystalline silicate reaction mixture which contains unincorporated silica, in-situ formed porous crystalline silicate and water. The resulting compositions exhibit improved hydrothermal stability and octane enhancement as additives in catalytic cracking.

12 Claims, No Drawings

CRYSTALLINE POROUS SILICATE COMPOSITE AND ITS USE IN CATALYTIC CRACKING

This is a division of copending application Ser. No. 093,279, filed on Sept. 4, 1987 and now abandoned.

This invention relates to a method for preparing shape-selective porous crystalline silicates bound with an inorganic oxide matrix wherein the matrix precursor is added to the crystalline silicate reaction mixture after crystallization of said silicate. This invention further relates to the use of such catalyst compositions in catalytic cracking of hydrocarbons, especially as octane enhancement additives to the cracking catalyst inventory. For the purposes of the present invention, shape-selective porous crystalline silicates are those porous crystalline silicates having a Constraint Index of about 1 to about 12 as further described below.

Hydrocarbon conversion processes utilizing porous crystalline silicates such as zeolites have been the subject of extensive investigation during recent years, as is obvious from both the patent and scientific literature. Zeolites (a term which for present purposes is used interchangeably with "porous crystalline silicates") have been found to be particularly effective for a wide variety of hydrocarbon conversion processes, including the catalytic cracking of a gas oil to produce motor fuels and have been described and claimed in many patents, including U.S. Pat. Nos. 3,140,249; 3,140,251; 3,140,252; 3,140,253 and 3,271,418. It is also known in the prior art to incorporate the crystalline zeolite into a matrix for catalytic cracking and such disclosure appears in one or more of the above-identified U.S. patents.

It is also known that improved results will be obtained with regard to the catalytic cracking of gas oils if a crystalline zeolite having a pore size of less than 7 Angstom units, e.g. ZSM-5, is admixed with a crystalline zeolite having a pore size greater than 8 Angstrom units, either with or without a matrix. A disclosure of this type is found in U.S. Pat. No. 3,769,202. Although the incorporation of a crystalline zeolite having a pore size of less than 7 Angstrom units into a catalyst comprising a larger pore size crystalline zeolite (pore size greater than 7 Angstrom units) has indeed been very effective with respect to the raising of octane number, nevertheless it did so at the expense of the yield of gasoline.

Improved octane number with some loss in gasoline yield was shown in U.S. Pat. No. 3,758,403. In said patent, the cracking catalyst was comprised of a large pore size crystalline zeolite (pore size greater than 7 Angstrom units) in admixture with ZSM-5 zeolite, wherein the ratio of ZSM-5 zeolite to large pore size crystalline zeolite was in the range of 1:10 to 3:1.

The use of ZSM-5 zeolite in conjuction with a zeolite cracking catalyst of the X or Y faujasite variety is described in U.S. Pat. Nos. 3,894,931; 3,894,933; 3,894,934 and 4,521,298. The first two patents disclose the use of ZSM-5 zeolite in amounts up to and about 5 to 10 wt. %; the third patent discloses the weight ratio of ZSM-5 zeolite to large pore size crystalline zeolite in the range of 1:10 to 3:1. The fourth utilizes a catalyst inventory wherein the zeolite is unbound.

All of the above patents are incorporated herein by reference.

ZSM-5 catalyst, especially virgin catalyst, has exceedingly high activity. Researchers have attempted to take advantage of the activity of fresh ZSM-5 catalyst by adding only small amounts of it to the cracking catalyst inventory. Typical of such work is U.S. Pat. No. 4,309,280, the entire contents of which are incorporated herein by reference. This patent teaches that the addition of very small amounts of powdered ZSM-5 catalyst, characterized by a particle size less than 5 microns can substantially enhance product octane number, while increasing $C_{5+}$ gasoline plus potential alkylate yield. It is also known that the octane/yield of ZSM-5-containing additive catalyst in catalytic cracking can be improved by steaming the additive as is described in U.S. patent application Ser. No. 801,103 filed Nov. 22, 1985.

The use of shape-selective zeolite-containing catalysts to increase refinery gasoline octane is receiving considerable attention of late, particularly in fluidized catalytic cracking (FCC) and moving bed catalytic cracking processes, e.g., Thermofor Catalytic Cracking (TCC). Accordingly, there is a substantial incentive to reduce the cost of manufacturing both the shape-selective zeolite crystals and the finished catalyst to be used in cracking. In addition, any improvements in a shape-selective zeolite catalyst's hydrothermal stability would reduce catalyst requirements and thereby improve the cost effectiveness of such zeolites in cracking.

Zeolite additive catalysts used in catalytic cracking are ordinarily prepared by methods which require separating out ZSM-5 from its reaction mixture and admixing it with an inorgainic oxide in a hydrous state or in a dried state. The need to separate out the zeolite from it reaction mixture, followed by washing and drying, adds significant costs to the bound catalyst. For example, although U.S. Pat. No. 4,612,298 teaches preparation of a clay bound zeolite Y cracking catalyst in the presence of silica, this silica appears to be added rather than derived from the zeolite reaction mixture. Moreover, unincorporated silica and alumina remaining in the reaction mixture are unavailable for use in the bound catalyst. Accordingly, it would be desirable to find a way of reducing the cost of preparing shape-selective bound porous crystalline silicate-containing catalysts used in catalytic cracking while avoiding alteration of the desirable properties of such catalysts.

It has now been found that porous crystalline silicates can be bound with a source of inorganic oxide matrix selected from the group consisting of silica and alumina at least some of which is obtained from unincorporated inorganic oxide taken from a porous crystalline silicate reaction mixture mother liquor. Such inorganic oxide has not been incorporated into the porous crystalline silicate framework and can include oxides such as those selected from the group consisting of silica, alumina, gallia, boria, germania, magnesia, titania and beryllia with silica and alumina, particularly preferred. The reaction mixture mother liquor may be one which is used to prepare a porous crystalline silicate other than the shape-selective porous crystalline silicate being composited or bound with inorganic oxide matrix.

In one aspect of the invention shape-selective porous crystalline silicates can be composited with an inorganic oxide matrix by adding said matrix precursors to the porous crystalline silicate reaction mixture comprising a source of silicon and water, after exposing said mixture to crystallization conditions. Such a method is advantageous in that it utilizes unused silica and/or alumina present in the reaction mixture, which has not been incorporated in the porous crystalline silicate framework, by incoporating said silica and/or alumina in the inorganic oxide matrix. Moreover, the resulting bound catalyst can exhibit enhanced hydrothermal stability and octane improvement capabilities compared with conventionally prepared materials.

The present invention can also be described as a method for preparing an inorganic oxide matrix bound porous crystalline silicate having a Constraint Index of between about 1 and about 12. This method comprises a) preparing said silicate from a reaction mixture which comprises a source of silicon and water, b) thereafter adding to said reaction mixture which contains unincorporated silica, as well as the crystalline silicate, an inorganic oxide matrix precursor comprising a source of inorganic oxide matrix and water. Drying the resulting mixture produces an inorganic oxide matrix-bound porous crystalline silicate. By this method, unincorporated silica in the reaction mixture is incorporated in the inorganic oxide matrix. The porous crystalline silicate can have a structure selected from the group consisting of zeolite beta, ZSM-5, ZSM-11, ZSM-5/ZSM-11, ZSM-12, ZSM-22, ZSM-23, ZSM-35, ZSM-38, ZSM-48, and ZSM-50; preferably the structure of ZSM-5. The reaction mixture may also comprise a source of aluminum, a source of alkali metal and an organic directing agent. Preferably the reaction mixture comprises amorphous precipitated silica as a source of silicon.

In one preferred embodiment, the porous crystalline silicate of the invention has the structure of ZSM-5, while the reaction mixture contains a source of aluminum which includes aluminum sulfate. Any suitable source of alkali metal can be used, with sodium hydroxide particularly preferred. Any suitable organic directing agent may be used; an n-alkylamine is particularly preferred. The initial solids content of said reaction mixture employed in the present invention is greater than about 10 wt. %, preferably at least 15 or even 20 wt. %. The drying step can be accomplished by any suitable means. Spray drying is particularly useful to form an inorganic oxide matrix-bound porous crystalline silicate having a particle diameter of about 20 to 120 microns, a size suited for fluidized catalytic cracking. Generally, the organic directing agent employed in the zeolite formation can be essentially removed by any suitable technique prior to adding said matrix precursor, e.g. flashing. The resulting composite product comprises about 40 to 95, preferably about 75 to 95 wt. %. of inorganic oxide matrix.

The present invention also relates to a method for catalytic cracking of a hydrocarbon feedstock in a cracking unit to a product comprising gasoline. Such cracking takes place in the presence of a cracking catalyst inventory comprising the bound product of the invention and a catalytically active large pore size crystalline silicate cracking catalyst having a pore size greater than about 7 angstroms. Such catalysts include amorphous silica-alumina, crystalline silica-alumina and crystalline zeolites selected from the group consisting of zeolite X, zeolite Y, and naturally occurring faujasite. Zeolite Y, particularly rare earth-exchanged zeolite Y, is a suitable catalytically active large pore size porous crystalline silicate cracking catalyst.

In another embodiment of the invention, the catalyst composite can be treated with steam at a partial pressure between 0 and 45 psig, and at a temperature in the range between 400° and 1600° F., preferably for at least about 10 hours.

The catalyst composite of the invention is suited to catalytic cracking processes in general, especially in fluid bed cracking units (FCC) and moving bed catalytic cracking units.

The present invention further provides a process for catalytically cracking a hydrocarbon feedstock in a cracking unit to a product comprising gasoline in the presence of a cracking catalyst under cracking conditions. The cracking catalyst comprises a catalytically active cracking component admixed with a porous crystalline silicate having a Constraint Index between 1 and 12 and a silica-to-alumina ratio greater than about 12. The improvement resides in the porous crystalline silicate being bound with inorganic oxide matrix prior to removal of the porous crystalline silicate from its reaction mixture.

Addition of a catalyst composition of the present invention, comprising one or more members of a class of shape-selective zeolites, as defined hereinafter, is extemely effective as an octane and total yield improver in relatively small amounts when used in conjunction with a conventional cracking catalyst. It has been found that only about 0.01 to 10.0 wt. % of this class of zeolites needs to be added to the conventional cracking catalyst in the unit under conventional cracking operations to increase octane. Octane increase and total yield can be varied with the content of the shape-selective zeolite. If excess alkylation capacity is available, $C_5^+$ gasoline plus alkylate yields are higher when a steam treated shape-selective porous crystalline silicate of the present invention is utilized, as compared to conventional commercial cracking catalysts, containing conventionally prepared, steamed, shape-selective porous crystalline silicates.

Steaming of the shape-selective porous crystalline silicate can occur primarily in two ways. In one method, the porous crystalline silicate may be steamed under certain conditions specified herein prior to adding the porous crystalline silicate to the catalytic reactor. The other method is to add the porous crystalline silicate to be steamed to the catalytic reactor unit and expose it to steaming conditions within the reactor specified herein for a period of time sufficient to adequately steam the catalyst.

It is clear from the foregoing that octane gain can be controlled to the extent desired by the introduction of only very small amounts of the shape-selective porous crystalline silicate of the present invention. In commercial practice, to octane gain could be maximized or controlled, for example, to operate at full alkylation capacity which is dependent on $C_3-C_4$ olefins and isobutane availability.

The particular proportion of the shape-selective zeolite introduced to the conventional cracking catalyst inventory is an important feature, in that such a very small amount of such zeolite is required to produce substantial octane gains without substantial gasoline plus distillate yield loss. The weight percent of the shape-selective zeolite required in relation to the total quantity of conventional cracking catalyst in the unit can range between about 0.01 and about 10.0, and preferably from between about 0.05 and about 5.0, and most preferably between 1.0 and 2.0. The exact weight percent will vary from cracking unit to cracking unit, depending on the desired octane number, total gasoline yield required, the available feedstock, and the content of active component in the conventional cracking catalyst.

The shape-selective porous crystalline silicate can be injected into the reactor at any time during the catalytic cracking process. It can be added in the same catalyst particle as the cracking component, in a separate catalyst particle, or as a particle consisting in part or totally of shape-selective porous crystalline silicate crystals. The shape-selective porous crystalline silicate can be introduced while the cracking unit is down, or while the cracking unit is on on-stream operation. Once such porous crystalline silicate is added to the cracking process, the refiner can return to conventional operation or an operation at lower octane number by eliminating or decreasing the use of the shape-selective porous crystalline silicate.

Catalytic cracking units which are amenable to the process of this invention operate within the temperature range of about 400° F. (205° C.) to 1600° F. (871° C.), and under reduced, atmospheric or superatmospheric pressure. The catalytic cracking process can be either fixed bed, moving bed or fluidized bed, and the hydrocarbon chargestock flow may be either concurrent or countercurrent to the conventional catalyst flow. The process of this invention is particularly applicable to the fluid catalytic cracking (FCC) process.

The FCC process is well known to the art and a detailed description thereof is not believed necessary. Although the design and construction of individual plants vary, the essential elements of an FCC unit are illustrated in U.S. Pat. No. 4,368,114, which is incorporated herein by reference.

Briefly, in the FCC process the catalyst is in the form of microspheres, which acts as a fluid when suspended in oil vapor or gas. the hydrocarbons contact the fluidized catalyst and are catalytically cracked to lighter products. The catalyst is deactivated by coke deposition, necessitating regeneration of coked catalyst in a regenerator.

As mentioned previously, a feature of the present invention resides in its flexibility in the way the shape-selective porous crystalline silicate may be added in the same catalyst particle as the cracking component or as a separate catalyst particle. Further, the shape-selective porous crystalline silicate may be added to the regenerator or, if present as small size particles, directly to the hydrocarbon feed.

After cracking, the resulting product gas can be compressed and the resulting products may suitably be separated from the remaining components by conventional means, such as adsorption, distillation, etc.

Catalysts containing both the large pore and shape-selective zeolites can be prepared by the present invention by addition of the large pore zeolite to the binder/shape-selective zeolite mixture, preferably before drying. Representative crystalline zeolite active component constitutents of said cracking catalysts include zeolite X (U.S. Pat. No. 2,882,244), zeolite Y (U.S. Pat. No. 3,130,007), synthetic mordenite and dealuminized synthetic mordenite, merely to name a few, as well as naturally occurring zeolites, including chabazite, faujasite, mordenite, and the like. Preferred crystalline zeolites include, natural faujasite and the synthetic faujasite zeolites X and Y, with particular preference being accorded zeolite Y. For the purposes of the present invention, zeolite Y includes zeolite Y in its as-synthesized form as well as its variant forms including framework dealuminated zeolite Y, e.g., ultrastable Y (USY) (described in U.S. Pat. No. 3,293,192) and LZ-210 (described in U.S. Pat. No. 4,503,023).

In general, the large pore crystalline zeolites are ordinarily ion exchanged either separately or in the final catalyst with a desired cation to replace alkali metal present in the zeolite as found naturally or as synthetically prepared. The exchange treatment is such as to reduce the alkali metal content of the final catalyst to less than about 1.5 wt. % and preferably less than about 0.5 wt. %. The purpose of ion exchange is to substantially remove alkali metal cations which are known to be deleterious to cracking, as well as to introduce particularly desired catalytic activity by means of the various cations used in the exchange medium. For the cracking operation described herein, preferred cations are hydrogen, ammonium, rare earth and mixtures thereof, with particular preference being accorded rare earth. Such rare earth elements include Sm, Nd, Pr, Ce and La. Ion exchange is suitably accomplished by conventional contact of the zeolite with a suitable salt solution of the desired cation such as, for example, the sulfate, chloride or nitrate.

The shape-selective porous crystalline silicate of the cracking catalyst is incorporated in a suitable inorganic oxide matrix because this catalyst form is generally characterized by a high resistance to attrition, high activity and exceptional steam stability. The inorganic oxide which serves as the matrix in which the above porous crystalline silicate is distributed includes silica gel or a cogel of silica and a suitable metal oxide. Representative cogels include silica-alumina, silica-magnesia, silica-zirconia, silica-thoria, silica-beryllia, silica-titania, as well as ternary combinations such as silica-alumina-magnesia, silica-alumina-zirconia and silica-magnesia-zirconia. Preferred cogels include silica-alumina, silica-zirconia or silica-alumina-zirconia. The above gels and cogels will generally comprise a major proportion of silica and a minor proportion of the other aforementioned oxide or oxides. Thus, the silica content of the siliceous gel or cogel matrix will generally fall within the range of 55 to 100 wt. %, preferably 60 to 95 wt. %, and the other metal oxide or oxides content will generally be within the range of 0 to 45 wt. % and preferably 5 to 40 wt. %. In addition to the above, the matrix may also comprise natural or synthetic clays, such as kaolin type clays, montmorillonite, bentonite or halloysite. These clays may be used either alone or in combination with silica or any of the above specified cogels in matrix formulation.

The content of shape-selective porous crystalline silicate in the bound catalyst is generally between about 5 and about 60 wt. %. Ion exchange of the shape-selective porous crystalline silicate to replace its initial alkali metal content can be accomplished either prior to or subsequent to incorporation of the porous crystalline silicate into the matrix.

The above compositions may be readily processed so as to provide fluid cracking catalysts by spray drying the composite to form microspheroidal particles of suitable size. Alternatively, the composition may be adjusted to suitable concentration and temperature to form bead-type catalyst particles suitable for use in moving bed type cracking systems. The catalyst may also be used in various other forms such as those obtained by tabletting, balling or extruding.

Hydrocarbon chargestocks undergoing cracking in accordance with this invention comprise hydrocarbons generally and, in particular, petroleum fractions having an initial boiling range of at least 400° F. (205° C.), a 50% point of at least 500° F. (260° C.), and an end point of at least 600° F. (315° C.). Such hydrocarbon fractions include gas oils, residual oils, cycle stocks, whole top crudes and heavy hydrocarbon fractions derived by the destructive hydrogenation of coal, tar, pitches, asphalts and the like. As will be recognized, the distillation of higher boiling petroleum fractions above about 750° F. (400° C.) must be carried out under vacuum in order to avoid thermal cracking. The boiling temperatures utilized herein are expressed, for convenience, in terms of the boiling point corrected to atmospheric pressure.

For purposes of this invention, the term "zeolite" is meant to represent the class of porotectosilicates, i.e. porous crystalline silicates that contain silicon and oxygen atoms as the major components. Other components may be present in minor amounts, usually less than 14 mole %, and preferably less than 4 mole %. These components include aluminum, gallium, iron, boron and the like, with aluminum being preferred, and used herein for illustration purposes. The minor components may be present separately or in mixtures.

The silica-to-alumina mole ratio referred to may be determined by conventional analysis. This ratio is meant to represent, as closely as possible, the ratio in the rigid anionic framework of the zeolite crystal and to exclude aluminum in the binder or in cationic or other form within the channels. Although zeolites with a silica-to-alumina mole ratio of at least 12 are useful, it is preferred, in some instances, to use zeolites having much higher silica-to-alumina mole ratios, i.e. ratios of at least 500:1. In addition, zeolites, as otherwise characterized herein but which are substantially free of aluminum, i.e. having silica-to-alumina mole ratios up to infinity, are found to be useful and even preferable in some instances. Such "high silica" zeolites are intended to be included within this description. The novel class of zeolites, after activation, acquire an intra-crystalline sorption affinity for normal hexane, which is greater than that for water, i.e. they exhibit "hydrophobic" properties.

The members of the class of shape-selective zeolites useful herein have an effective pore size of generally less than about 7 Angstroms, such as to freely sorb normal hexane. In addition, the structure must provide constrained access to larger molecules. It is sometimes possible to judge from a known crystal structure whether such constrained access exists. For example, if the only pore windows in a crystal are formed by 8-membered rings of silicon and aluminum atoms, then access by molecules of larger cross-section than normal hexane is excluded and the zeolite is not of the desired type. Windows of 10-membered rings are preferred, although, in some instances, excessive puckering of the rings or pore blockage may render these zeolites ineffective.

Although 12-membered rings in theory would not offer sufficient constraint to produce advantageous conversions, it is noted that the puckered 12-ring structure of TMA offretite does show some constrained access. Other 12-ring structures may exist which may be operative for other reasons, and therefore, it is not the present intention to entirely judge the usefulness of the particular zeolite solely from theoretical structural considerations.

A convenient measure of the extent to which a zeolite provides control to molecules of varying sizes to its internal structure is the Constraint Index of the zeolite. Zeolites which provide a highly restricted access to and egress from its internal structure have a high value for the Constraint Index, and zeolites of this kind usually have pores of small size. On the other hand, zeolites which provide relatively free access to the internal zeolite structure have a low value for the Constraint Index. The method by which Constraint Index is determined is described fully in U.S. Pat. No. 4,016,218, incorporated herein by reference for details of the method. Constraint Index (CI) values for some typical materials are:

|  | CI (at test temperature) |
|---|---|
| ZSM-4 | 0.5 (316° C.) |
| ZSM-5 | 6–8.3 (371° C.–316° C.) |
| ZSM-11 | 5–8.7 (371° C.–316° C.) |
| ZSM-12 | 2.3 (316° C.) |
| ZSM-20 | 0.5 (371° C.) |
| ZSM-22 | 7.3 (427° C.) |
| ZSM-23 | 9.1 (427° C.) |
| ZSM-34 | 50 (371° C.) |
| ZSM-35 | 4.5 (454° C.) |
| ZSM-38 | 2 (510° C.) |
| ZSM-48 | 3.5 (538° C.) |
| ZSM-50 | 2.1 (427° C.) |
| TMA Offretite | 3.7 (316° C.) |
| TEA Mordenite | 0.4 (316° C.) |
| Clinoptilolite | 3.4 (510° C.) |
| Mordenite | 0.5 (316° C.) |
| REY | 0.4 (316° C.) |
| Amorphous Silica-alumina | 0.6 (538° C.) |
| Dealuminized Y | 0.5 (510° C.) |
| Erionite | 38 (316° C.) |
| Zeolite Beta | 0.6–2.0 (316° C.–399° C.) |

The above-described Constraint Index is an important and even critical definition of those porous crystalline silicates which are useful in the instant invention. The very nature of this parameter and the recited technique by which it is determined, however, admit of the possibility that a given porous crystalline silicate can be tested under somewhat different conditions and thereby exhibit different Constraint Indices. Constraint Index seems to vary somewhat with severity of operations (conversion) and the presence or absence of binders. Likewise, other variables, such as crystal size of the porous crystalline silicate, the presence of occluded contaminants, etc., may affect the Constraint Index. Therefore, it will be appreciated that it may be possible to so select test conditions, e.g. temperature, as to establish more than one value for the Constraint Index of a particular porous crystalline silicate. This explains the range of Constraint Indices for some zeolites, such as ZSM-5, ZSM-11 and Beta.

It is to be realized that the above CI values typically characterize the specified porous crystalline silicates, but that such are the cumulative result of several variables useful in the determination and calculation thereof. Thus, for a given material exhibiting a CI value within the range of 1 to 12, depending on the temperature employed during the test method within the aforenoted range of 550° F. (290° C.) to 950° F. (570° C.), with accompanying conversion between 10% and 60%, the CI may vary within the indicated range of 1 to 12. Likewise, other variables such as the crystal size of the material, the presence of possibly occluded contaminants and binders intimately combined with the zeolite may affect the CI. It will accordingly be understood to those skilled in the art that the CI, as utilized herein, while affording a highly useful means for characterizing the materials of interest is approximate, taking into consideration the manner of its determination, with the possibility, in some instances, of compounding variable extremes. However, in all instances, at a temperature within the above-specified range of 550° F. to 950° C., the CI will have a value for any given material of interest herein within the approximate range of 1 to 12.

Zeolite beta is taught by U.S. Pat. No. 3,308,069, the disclosure of which is incorporated herein by reference.

Zeolite ZSM-5 is taught by U.S. Pat. No. 3,702,886, and Re. 29,949, the disclosures of which are incorporated herein by reference.

Zeolite ZSM-11 is taught by U.S. Pat. No. 3,709,979, the disclosure of which is incorporated herein by reference.

Zeolite ZSM-12 is taught by U.S. Pat. No. 3,832,449, issued Aug. 27, 1974, the disclosure of which is incorporated herein by reference.

Zeolite ZSM-23 is taught by U.S. Pat. No. 4,076,342, the disclosure of which is incorporated herein by reference.

Zeolite ZSM-35 is described by U.S. Pat. No. 4,016,245, the disclosure of which is incorporated herein by reference.

Zeolite ZSM-38 is described by U.S. Pat. No. 4,046,859, the disclosure of which is incorporated herein by reference.

Zeolite ZSM-48 is described by U.S. Pat. No. 4,397,827, the disclosure of which is incorporated herein by reference.

Zeolite ZSM-50 is described in U.S. Pat. No. 4,640,849, the disclosure of which is incorporated herein by reference. ZSM-50 is believed to be of similar structure to ICI's EU-1 disclosed in European Patent Application EPB 4226 and Teijin's TPZ-3, disclosed in European Patent Application EPA 51318.

The preferred porous crystalline silicates in this invention include those having the structure of zeolite beta, ZSM-5, ZSM-11, ZSM-12, ZSM-22, ZSM-23, ZSM-35, ZSM-38, ZSM-48, and ZSM-50, with ZSM-5 being particularly preferred.

ZSM-22 is a molecular sieve which can be made to be useful in the present improved process. In general, its as-synthesized composition is as follows:

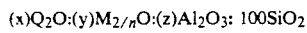

(x)Q$_2$O:(y)M$_{2/n}$O:(z)Al$_2$O$_3$: 100SiO$_2$ wherein Q$_2$O is the oxide form of an organic compound containing an element of Group VA of the Periodic Table of the Elements, e.g. N or P, preferably N, containing at least one alkyl or aryl group having at least 2 carbon atoms, M is an alkali metal or an alkaline earth metal having a valence n, and x=0.01–2.0, y=0–2.0 and z=0–5.

ZSM-22 has a definite X-ray diffraction pattern, set forth below in Table 1, which distinguishes it from other crystalline materials.

TABLE 1

| Interplanar d-spacings (A) | Relative Intensity (I/Io) |
| --- | --- |
| 10.9 ± 0.2 | M-VS |
| 8.7 ± 0.16 | W |
| 6.94 ± 0.10 | W-M |
| 5.40 ± 0.08 | W |
| 4.58 ± 0.07 | W |
| 4.36 ± 0.07 | VS |
| 3.68 ± 0.05 | VS |
| 3.62 ± 0.05 | S-VS |
| 3.47 ± 0.04 | M-S |
| 3.30 ± 0.04 | W |
| 2.74 ± 0.02 | W |

TABLE 1-continued

| Interplanar d-spacings (A) | Relative Intensity (I/Io) |
| --- | --- |
| 2.52 ± 0.02 | W |

These values were determined by standard techniques. The radiation was the K-alpha doublet of copper and a diffractometer equipped with a scintillation counter and an associated computer was used. The peak heights, I, and the positions as a function of 2 theta, where theta is the Bragg angle, were determined using algorithms on the computer associated with the spectrometer. From these, the relative intensities, 100 I/I$_o$ is the intensity of the strongest line or peak, and d (obs.) the interplanar spacing in Angstroms (A), corresponding to the recorded lines, were determined. In Table 1, the relative intensities are given in terms of the symbols VS=very strong, M=medium, W=weak, etc. It should be understood that this X-ray diffraction pattern is characteristic of all the species of ZSM-22. Ion exchange of the alkali metal cations with other ions results in substantially the same X-ray diffraction pattern with some minor shifts in interplanar spacing and variation in relative intensity. Other minor variations can occur, depending on the silica/alumina ratio of the particular sample, as well as its degree of thermal treatment.

ZSM-22 can be suitably prepared from a reaction mixture containing a source of silica, an alkane diamine, an alkali metal oxide or an alkaline earth metal oxide (e.g. sodium, potassium, cesium, calcium or strontium), water, and alumina, and having a composition, in terms of mole ratios of oxides, within the following ratios:

| Reactants | Broad | Preferred |
| --- | --- | --- |
| SiO$_2$/Al$_2$O$_3$ = | 20 or more | 30 to 1000 |
| H$_2$O/SiO$_2$ = | 10 to 100 | 20 to 60 |
| OH$^-$/SiO$_2$ = | 0 to 0.3 | 0.1 to 0.2 |
| M$^+$/SiO$_2$ = | 0 to 2.0 | 0.1 to 1.0 |
| RN/SiO$_2$ = | 0.01 to 2.0 | 0.05 to 1.0 | wherein RN is a C$_2$–C$_{12}$ alkane diamine of the formula H$_2$N—(CH$_2$)$_n$—NH$_2$ (abbreviated C$_n$DN), n=2 to 12, and preferably is 5 to 8, and M is an alkali metal or an alkaline earth metal, and maintaining the mixture at crystallization temperature until crystals of ZSM-22 are formed. Thereafter, the crystals are separated from the liquid by a conventional means, washed and recovered.

It should be realized that the reaction mixture components can be supplied by more than one source. The reaction mixture can be prepared either batchwise or continuously. Crystal size and crystallization time of the new crystalline material will vary with the nature of the reaction mixture employed and the crystallization conditions.

In all cases, synthesis of the new crystals is facilitated by the presence of at least 0.01 percent, preferably 0.10 percent and still more preferably 1 percent, seed crystals (based on total weight of crystalline product.)

The original cations of the above molecular sieves are preferably replaced in accordance with techniques well known in the art, at least in part, with hydrogen or hydrogen precursor cations and/or non-noble metal ions of Group VIII of the Periodic Table, e.g. nickel, iron and/or cobalt.

The shape-selective porous crystalline silicate used in this invention may be in the hydrogen form or it may be ion-exchanged or impregnated in accordance with well-known procedures in order to reduce alkali metal content of these materials.

In a preferred aspect of this invention, the shape-selective porous crystalline silicates are selected as those having a crystal framework density, in the dry hydrogen form, of not substantially below about 1.6 grams per cubic centimeter. It has been found that porous crystalline silicates which satisfy all three of the following criteria are most desired. The preferred shape-selective porous crystalline silicates of this invention are those having a Constraint Index as defined above of about 1 to 12, a silica-to-alumina mole ratio of at least about 12, and a dried crystal density of not substantially less than about 1.6 grams per cubic centimeter. The dry density for known structures may be calculated from the number of silicon plus aluminum atoms per 1000 cubic Angstroms, as given, e.g. on page 19 of the article on "Zeolite Structure" by W. M. Meier. This paper is included in *Proceedings of the Conference on Molecular Sieves*, published by the Society of Chemical Industry, London, April, 1967. When the crystal structure is unknown, the crystal framework density may be determined by classical pycnometer techniques. For example, it may be determined by immersing the dry hydrogen form of the porous crystalline silicate in an organic solvent which is not sorbed by the crystal. It is possible that the unusual sustained activity and stability of this class of zeolites are associated with its high crystal anionic framework density of not less than about 1.6 grams per cubic centimeter. This high density, of course, must be associated with a relatively small amount of free space within the crystal, which might be expected to result in more stable structures. This free space, however, seems to be important as the locus of catalytic activity.

Crystal framework densities of some typical zeolites, including some which are not within the purview of this invention are:

| Zeolite | Void Volume | Framework Density |
|---|---|---|
| Ferrierite | 0.28 cc/cc | 1.76 g/cc |
| Mordenite | .28 | 1.7 |
| ZSM-5, −11 | .29 | 1.79 |
| ZSM-12 | — | 1.8 |
| ZSM-23 | — | 2.0 |
| Dachiardite | .32 | 1.72 |
| L | .32 | 1.61 |
| Clinoptilolite | .34 | 1.71 |
| Laumontite | .34 | 1.77 |
| ZSM-4 (Omega) | .38 | 1.65 |
| Heulandite | .39 | 1.69 |
| P | .41 | 1.57 |
| Offretite | .40 | 1.55 |
| Levynite | .40 | 1.54 |
| Erionite | .35 | 1.51 |
| Gmelinite | .44 | 1.46 |
| Chabazite | .47 | 1.45 |
| A | .5 | 1.3 |
| Y | .48 | 1.27 |

Catalysts containing shape-selective porous crystalline silicates may be prepared in various ways. The catalyst may be separately prepared in the form of particles, such as pellets or extrudates, for example, and simply mixed in the required proportions. The particle size of the individual component particles may be quite small, for example, from about 20 to about 200 microns, when intended for use in fluid bed operation, or they may be as large as up to about ¼" for moving bed operation. Alternatively, the components may be mixed as powders and formed into pellets or extrudate, each pellet containing both components in substantially the required proportions.

The steaming process is achieved by partial pressure steaming of shape-selective porous crystalline silicate for a period of time so that, when admixed with conventional cracking catalyst, the resulting catalyst converts a contacting hydrocarbon stream to a gasoline product having a high RON+O without a substantial loss in gasoline plus distillate yield. Generally, the porous crystalline silicate is contacted with steam at a partial pressure of about 0 to 45 psig, at a temperature of from about 400° to 1600° F. (205° to 870° C.), preferably 800° to 1450° F. (430° to 790° C.) for a period of time not less than 5 hours, preferably not less than 10 hours, and most preferably between 10 and 60 hours.

It should be noted that the conditions for steaming the porous crystalline silicate may be interdependent upon one another. For example, if the steaming process is at the lower end of the temperature scale, the steaming time should be increased as a compensation measure.

The following examples will serve to illustrate the process of the invention without limiting the same.

The conventional cracking catalyst used in the examples to which the ZSM-5 zeolite catalyst was added was a commercially available rare earth-exchanged Y-Type zeolite FCC cracking catalyst produced via in-situ crystallization by Engelhard Corp., and was equilibrated through use in a commercial FCC unit.

In general, in order to improve the stability of a cracking catalyst, the large pore crystalline silicate catalyst is exchanged with a rare earth element, e.g. lanthanum, cerium, etc. Any rare earth oxide may be utilized in the catalyst; hence, the designation $RE_2O_3$ for rare earth oxide.

EXAMPLE 1

ZSM-5 crystals were prepared by the following procedure:

10.3 parts of aluminum sulfate, 14.1 parts of sodium hydroxide and 0.43 parts of Daxad 27, a surfactant available from W. R. Grace, Organic Chemicals Division, was dissolved in 234 parts of $H_2O$. The resultant solution had a specific gravity of 1.080±0.001. The aluminate solution was charged to an autoclave. One part ZSM-5 seeds as dispersed slurry, 103 parts HiSil 233 amorphous precipitated silica, 12.5 parts n-propylamine and 4.7 parts NaCl were added sequentially. The agitator of the autoclave was set so as to facilitate good mixing during the entire charging process. The autoclave was then sealed, heated to 320° F. and held at 320°±10° F. for 18 hours while maintaining vigorous agitation. The mixture was then cooled to 230° F., volatile organics were removed by flashing and the remaining slurry was cooled to room temperature. The autoclave was then discharged and the zeolite slurry product was diluted with a mixture of 130 ppm of flocculant (American Cynamid Magnafloc 1563C) and 4-5 parts water per part slurry. The slurry was allowed to settle and supernatant liquid was drawn off. The settled solids were reslurried to the original volume of the preceding step with water and 26 ppm of flocculant per part slurry were added. After settling, the aqueous phase was decanted and the reslurry, settling, decantation procedure repeated two more times for a total of 4 decant-washes. Following the final decant wash the zeolite slurry was filtered to 33.4% solids. A small sample of this filter cake was dried for analysis and identified as ZSM-5 (X-ray diffraction). Chemical analyses indicated that the $SiO_2/Al_2O_3$ molar ratio was 53.

EXAMPLE 2

The procedure of Example 1 was carried out through the ZSM-5 crystallization and flashing steps. Following autoclave discharge the ZSM-5 was retained in the crystallizer mother liquor for direct incorporation into a fluid catalyst. No further processing of the slurry was perfomed. A small portion of this slurry was filtered and dried for analysis. The dried zeolite was identified as ZSM-5 by X-ray diffraction. Chemical analyses indicated that the $SiO_2/Al_2O_3$ molar ratio was 58. The filtrate contained 6.4 wt. % $SiO_2$, 3.1% Na and <25 ppm $Al_2O_3$.

EXAMPLE 3

Solution A, containing 7.91 parts sodium silicate (28.7 wt. % $SiO_2$, 8.9 wt. % $Na_2O$, 62.4 wt. % $H_2O$) and 37.7 parts water, was cooled to 40°–45° F. and mixed at 700–800 rpm with a Cowles mixer while slowly adding 0.56 parts of 100% $H_2SO_4$. Over the next ½ hour solution B, containing 1 part aluminum sulfate (17.2 wt. % $Al_2O_3$) and 4.0 parts water, was slowly added and the resulting gel was agitated at 700–800 rpm for ½ hour. A slurry containing 2.45 parts ZSM-5 filter cake from Example 1 (0.82 parts ZSM-5 on 100% solids basis), 0.05 parts of a 10% Marasperse N dispersant solution available from Reed Lignin Inc., Rothschild, WI and 0.31 parts water were added to the gel and the resulting slurry was then mixed for 1 hour at 700–800 rpm. This material was then filtered on a Buchner funnel, reslurried to about 11% solids, homogenized and spray dried. The spray dried catalyst was then $NH_4NO_3$ exchanged, water washed and dried at 250° F. for at least 16 hours. The resulting catalyst contained 25% ZSM-5 in an amorphous $SiO_2—Al_2O_3$ matrix (dry basis).

EXAMPLES 4 and 5

A slurry was prepared by combining 4.35 parts of lower-cost ZSM-5 crystallizer slurry from Example 2 (0.82 parts ZSM-5 on 100% solids basis) with 7.2 parts sodium silicate (28.7 wt. % $SiO_2$, 8.9 wt. % $Na_2O$, 62.4 wt. % $H_2O$) and 37.7 parts water. This slurry was cooled to 40°–45° F. and mixed at 700–800 rpm with a Cowles mixer while slowly adding 0.51 parts of 100% $H_2SO_4$. A solution containing 1 part aluminum sulfate (17.2 wt. % $Al_2O_3$) and 4.00 parts water was next added to the slurry over a ½ hour period and the resulting gel was agitated at 700–800 rpm for ½ hour. The gel pH was then adjusted to 4.0 by adding 0.24 parts of 100% $H_2SO_4$ over a ½ hour period and the gel was mixed for 1 hour at 700–800 rpm, filtered on a Buchner funnel and reslurried to about 10% solids. At this point the reslurried material was separated into two equal portions. The first half was homogenized and spray dried, while the second portion was spray dried directly without homogenization. Both spray dried products were $NH_4NO_3$ exchanged, water washed and dried at 250° F. for at least 16 hours. The catalyst prepared with homogenization is designated Example 4 and the catalyst without homogenization is Example 5. Both catalysts contained 25% ZSM-5 in an amorphous $SiO_2$-$Al_2O_3$ matrix (dry basis).

EXAMPLE 6

The ZSM-5 additive catalyst from Example 3 was treated for 10 hours at 1450° F. with a 45% steam/55% air mixture at 0 psig in a fluidized-bed steaming apparatus.

EXAMPLE 7

The ZSM-5 additive catalyst from Example 4 was treated for 10 hours at 1450° F. with a 45% steam/55% air mixture at 0 psig in a fluidized-bed steaming apparatus.

EXAMPLE 8

The ZSM-5 additive catalyst from Example 5 was treated for 10 hours at 1450° F. with a 45% steam/55% air mixture at 0 psig in a fluidized-bed steaming apparatus.

EXAMPLES 9–11

Three blends, each containing 0.25% unsteamed ZSM-5 in commercial equilibrium REY cracking catalyst were prepared by combining 1 part unsteamed ZSM-5 additive from Examples 3, 4 and 5, respectively, with 99 parts of said REY catalyst.

EXAMPLES 12–14

Three blends, each containing 2% steamed ZSM-5 in a commercial equilibrium REY cracking catalyst were prepared by combining 8 parts steamed ZSM-5 additive catalyst from Examples 6, 7 and 8, respectively, with 92 parts of REY cracking catalyst.

Evaluations were conducted in a bench scale, fixed-fluidized bed unit at 960° F., cracking Joliet Sour Heavy Gas Oil (JSHGO); catalyst residence time was 1.0 minute while vapor residence time was 1.5–2 seconds. Runs were made at several catalyst to oil (C/O) ratios for each catalyst blend to cover a range of conversions. The resulting yields at a constant 60 vol. % conversion for the unsteamed ZSM-5 FCC additives are compared in Table 2. While comparable octane gains were obtained for the unsteamed current and improved lower-cost ZSM-5 additives, the improved lower-cost additives appear more active as indicated by the increased ($C_3^=+C_4^=+i-C_4$) yields, a measure of ZSM-5 activity. With available alkylation capacity and outside i-$C_4$ this increased activity results in a greater potential liquid yield (G+D+A).

The yields for the steamed ZSM-5 additives (2% ZSM-5 in REY Cracking Catalyst, Examples 12–14) are given in Table 3 at a constant 60 vol. % conversion. As indicated by the octane improvement and increased ($C_3^=+C_4^=+i-C_4$) yields, the lower-cost ZSM-5 additives exhibit greater hydrothermal stability. This improved stability should translate directly into lower additive catalyst makeup rates and thereby improve the cost effectiveness of ZSM-5 in cracking.

TABLE 2

Comparison of Unsteamed Conventional Preparation and Improved ZSM-5
Additives in Equilibrium REY Cracking Catalyst
Fixed-Fluidized Bed, 960° F., 1.0 Min. On-Stream, JSHGO

| | REY Catalyst | +0.25% Unsteamed ZSM-5 | | |
| --- | --- | --- | --- | --- |
| | | Conventional Preparation | Improved Lower-Cost W/Homog. | Improved Lower-Cost W/O Homog. |
| Catalyst Description | | | | |
| ZSM-5 | — | Example 1 | Example 2 | Example 2 |
| Additive Catalyst | — | Example 3 | Example 4 | Example 5 |
| Catalyst Blend | — | Example 9 | Example 10 | Example 11 |
| Yields at 60 Vol. % Conversion | | | | |
| $C_5^+$ Gasoline (G), % Vol. | 49.6 | 39.5 | 36.4 | 37.9 |
| Total $C_4$'s, % Vol. | 11.3 | 17.4 | 16.9 | 17.3 |
| Dry Gas, % Wt. | 6.2 | 11.6 | 12.7 | 11.7 |
| Coke, % Wt. | 3.8 | 4.0 | 3.7 | 3.8 |
| $C_3^= + C_4^= + i - C_4$, % Vol. | 15.8 | 29.9 | 31.7 | 31.8 |
| G + D, % Vol. | 83.0 | 71.9 | 69.8 | 71.1 |
| $C_5^+$ Gasoline + Potential Alkylate (PA), % Vol. | 69.6 | 79.5 | 79.9 | 82.9 |
| G + D + PA, % Vol. | 103.0 | 112.0 | 113.5 | 115.6 |
| Outside $i - C_4$, % Vol. | 9.7 | 21.6 | 24.7 | 25.4 |
| RON + O, $C_5^+$ Gasoline | 88.8 | 92.0 | 91.6 | 91.8 |
| RON + O, G + PA | 90.3 | 92.8 | 92.7 | 92.8 |
| $\Delta$ RON + O, $C_5^+$ Gasoline | — | +3.2 | +2.8 | +3.0 |
| $\Delta (C_3^= + C_4^= + i - C_4)$, % Vol. | — | +14.1 | +15.9 | +16.0 |

W: With
W/O: Without
Homog: Homogenization
JSHGO: Joliet Sour Heavy Gas Oil

TABLE 3

Comparison of Steamed Conventional Preparation and Improved ZSM-5
Additives in Equilibrium REY Cracking Catalyst
Fixed-Fluidized Bed, 960° F., 1.0 Min. On-Stream, JSHGO
All Additives Steamed: 10 hours, 1450° F., 45% Steam/55% Air, 0 psig

| | REY Catalyst | +2.0% Steamed ZSM-5 | | |
| --- | --- | --- | --- | --- |
| | | Conventional Preparation | Improved Lower-Cost W/Homog. | Improved Lower-Cost W/O Homog. |
| Catalyst Description | | | | |
| ZSM-5 | — | Example 1 | Example 2 | Example 2 |
| Additive Catalyst | — | Example 6 | Example 7 | Example 8 |
| Catalyst Blend | — | Example 12 | Example 13 | Example 14 |
| Yields at 60 Vol. % Conversion | | | | |
| $C_5^+$ Gasoline (G), % Vol. | 49.6 | 46.6 | 43.7 | 43.4 |
| Total $C_4$'s, % Vol. | 11.3 | 13.0 | 15.1 | 15.4 |
| Dry Gas, % Wt. | 6.2 | 7.3 | 8.6 | 8.4 |
| Coke, % Wt. | 3.8 | 4.1 | 4.2 | 4.1 |
| $C_3^= + C_4^= + i - C_4$, % Vol. | 15.8 | 19.5 | 23.6 | 23.5 |
| G + D, % Vol. | 83.0 | 80.9 | 76.6 | 76.8 |
| $C_5^+$ Gasoline + Potential Alkylate (PA), % Vol. | 69.6 | 71.5 | 74.3 | 73.6 |
| G + D + PA, % Vol. | 103.0 | 106.0 | 107.3 | 107.2 |
| Outside $i - C_4$, % Vol. | 9.7 | 12.7 | 15.8 | 15.3 |
| RON + O, $C_5^+$ Gasoline | 88.8 | 90.1 | 90.8 | 90.5 |
| RON + O, G + PA | 90.3 | 91.5 | 92.1 | 92.0 |
| $\Delta$ RON + O, $C_5^+$ Gasoline | — | +1.3 | +2.0 | +1.7 |
| $\Delta (C_3^= + C_4^= + i - C_4)$, % Vol. | — | +3.7 | +7.8 | +7.7 |

W: With
W/O: Without
Homog: Homogenization
JSHGO: Joliet Sour Heavy Gas Oil

What is claimed is:

1. A method for catalytically cracking gas oils, residual oils, and admixtures thereof in a cracking unit to a product comprising increased $C_3$ and $C_4$ olefins and gasoline of an increased octane number, wherein the method comprises in combination subjecting the gas oil to catalytic cracking conditions, in the presence of a cracking catalyst inventory comprising an inorganic oxide matrix bound porous crystalline silicate having a Constraint Index of between about 1 and about 12 and a catalytically active cracking catalyst selected from the group consisting of amorphous silica-alumina, crystalline silica-alumina and large pore crystalline zeolites, wherein said inorganic oxide matrix bound porous crystalline silicate is produced by (a) preparing said silicate from a reaction mixture which comprises a source of silicon and water, (b) thereafter adding to said reaction mixture which contains unincorporated silica and a crystalline silicate, an inorganic oxide matrix precursor comprising a source of inorganic oxide matrix and water and (c) spray drying the resulting mixture to produce an inorganic oxide matrix bound porous crystalline silicate whereby said unincorporated silica is incorporated in said matrix; and (d) subjecting said inorganic oxide matrix bound porous crystalline silicate to steam; producing gasoline of said octane number and $C_3$ and $C_4$ olefins; recovering said $C_3$ and $C_4$ olefins; and passing said steamed silicate to said cracking unit.

2. The method of claim 1 wherein said large pore crystalline zeolite is selected from the group consisting of zeolite X, zeolite Y, and faujasite and said crystalline silicate is ZSM-5.

3. The method of claim 2 wherein said large pore crystalline zeolite is zeolite Y.

4. The method of claim 1 wherein said inorganic oxide matrix bound porous crystalline silicate is treated with steam at a partial pressure between 0 and 45 psig and at a temperature in the range between 400° and 1600° F.

5. The method of claim 1 wherein said cracking unit is a fluid catalytic cracking unit (FCC).

6. The method of claim 5, wherein said inorganic oxide matrix bound porous crystalline silicate is subjected to steam at a partial pressure between 0 and 45 psig and at a temperature in the range between 400° and 1600° F.

7. The process recited in claim 5 wherein the reaction zone of said catalytic cracking unit is maintained at a temperature from about 800° F. to about 1300° F.

8. The process recited in claim 5 wherein the reaction zone of said catalytic cracking unit is maintained at a temperature from about 900° F. to about 1100° F.

9. The method of claim 1 wherein said porous crystalline silicate has the structure selected from the group consisting of zeolite beta, ZSM-5, ZSM-11, ZSM-5/ZSM-11, ZSM-12, ZSM-22, ZSM-23, ZSM-35, ZSm 48 and ZSM-50.

10. The method of claim 9 wherein porous crystalline silicate has the structure of zeolite ZSM-5.

11. The method claim 1 wherein said large pore crystalline zeolite is selected from the group consisting of zeolite X, zeolite Y, and faujasite.

12. The method of claim 11 wherein said large pore crystalline zeolite is zeolite Y.

* * * * *